(12) United States Patent
Liang et al.

(10) Patent No.: US 9,442,817 B2
(45) Date of Patent: Sep. 13, 2016

(54) DIAGNOSIS OF APPLICATION SERVER PERFORMANCE PROBLEMS VIA THREAD LEVEL PATTERN ANALYSIS

(75) Inventors: Xiaojun Liang, Cupertino, CA (US); Xuwen Yu, Palo Alto, CA (US); Aalap Desai, Mountain View, CA (US); Aiguo Dong, Los Altos, CA (US); Rajit Kambo, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 963 days.

(21) Appl. No.: 12/901,228

(22) Filed: Oct. 8, 2010

(65) Prior Publication Data

US 2012/0089724 A1    Apr. 12, 2012

(51) Int. Cl.
*G06F 11/32* (2006.01)
*G06F 11/34* (2006.01)

(52) U.S. Cl.
CPC ......... *G06F 11/328* (2013.01); *G06F 11/3409* (2013.01); *G06F 11/3495* (2013.01); *G06F 11/3476* (2013.01); *G06F 2209/508* (2013.01)

(58) Field of Classification Search
CPC ............. G06F 11/328; G06F 11/3495; G06F 11/3409
USPC .......................................................... 709/224
See application file for complete search history.

(56) References Cited

U.S. PATENT DOCUMENTS

| | | | |
|---|---|---|---|
| 5,463,775 A * | 10/1995 | DeWitt et al. | 702/186 |
| 5,784,616 A * | 7/1998 | Horvitz | 718/102 |
| 5,845,310 A * | 12/1998 | Brooks | 711/3 |
| 6,381,635 B1 * | 4/2002 | Hoyer et al. | 709/207 |
| 2003/0196136 A1 * | 10/2003 | Haynes et al. | 714/13 |
| 2006/0080364 A1 * | 4/2006 | Lake | 707/200 |
| 2008/0270399 A1 * | 10/2008 | Feng | G06K 9/00993 |
| 2010/0082513 A1 * | 4/2010 | Liu | 706/46 |

\* cited by examiner

*Primary Examiner* — Philip Chea
*Assistant Examiner* — Robert B McAdams

(57) ABSTRACT

Performance of server that is managing a group of servers, such as in a cloud, is analyzed by identifying patterns of threads executed in the server. A command is issued, repeatedly over a time period, to an operating system of the server to return a resource consumption value representative of the amount of computing resources consumed by one or more threads. The returned resource consumption values are stored and used to generate points on a graph which depicts the amount of computing resources consumed by the one or more threads over the time period and provide task breakdowns and latency information for each of the tasks.

11 Claims, 8 Drawing Sheets

DIAGNOSIS OF APPLICATION SERVER PERFORMANCE PROBLEMS VIA THREAD LEVEL PATTERN ANALYSIS

BACKGROUND

Detection of performance bottlenecks in software application execution is an active area of research. Presently, performance engineers are equipped with a number of performance analysis tools—such as JConsole™ by Sun Microsystems® and Rational Quantify™ by IBM®—which assist in the identification of performance metrics by providing processing latency breakdowns and, further, by providing visibility into the behavior of the application through debugging interfaces. These tools, however, are limited to analysis of the application at a low level and are often targeted only to a specific coding language or execution environment. For example, JConsole™ software is targeted toward Java™-based applications that execute on a Java™ Virtual Machine. Since, oftentimes, performance of a Java™-based application is dependent upon one or more applications that are not Java™-based, it is difficult to effectively determine the cause of a performance bottleneck that is occurring in the application. Furthermore, JConsole™ fails to provide high-level application performance metrics—such as, for example, any dependencies between threads that comprise a multi-threaded application—which are often the very cause of high-level performance bottlenecks.

In another approach, log files produced by the application may be parsed to identify performance metrics. For example, an administrator may review a log file that includes one or more time-stamped entries that are each associated with a different processing task that was executed by the server at the time the corresponding timestamp was recorded. However, the format of and/or data included in application log files is configured by those who developed the application and, since no standard log file methodologies have been established amongst developers, the log files are often cryptic and unreadable to the administrator. Further, developers often configure application activity logging to a minimum in attempt to reduce central processing unit (CPU) resources required to write to the log file and also to reduce the amount of memory that is required to store the log file. This diminishes the overall amount of information included in the log file that is useful to the administrator when seeking to identify potential performance bottlenecks.

Accordingly, there remains a need in the art for an enhanced technique used to identify performance bottlenecks.

SUMMARY

One or more embodiments of the present invention provide a method for monitoring performance of an application server for a group of servers in which one or more threads that manage the group of servers are executed. One advantageous feature of such a method is that high-level processing bottlenecks may be automatically identified.

A method of monitoring performance of an application server for a group of servers in which one or more threads that manage the group of servers are executed, includes the steps of issuing a command to an operating system of the application server to return a resource consumption value representative of the amount of computing resource consumed by one or more threads and storing the resource consumption value. These steps are repeated multiple times over a time period of interest. Subsequently, a graph is displayed, where the graph depicts the amount of computing resources consumed by the one or more threads over the time period using the stored resource consumption values.

According to another embodiment of the present invention, potential performance improvement areas are identified in an application server for a group of servers in which one or more threads that manage the group of servers are executed. A command is issued to an operating system of the application server to return a resource consumption value representative of the amount of computing resource consumed by one or more threads. Over a time period, the command is repeatedly issued and the returned resource consumption value is stored. Subsequently, potential performance improvement areas in the application server are identified based on comparing changes in the resource consumption value over the time period with predetermined patterns.

Further embodiments of the present invention provide a non-transitory computer readable storage medium that includes instructions for causing a computer system to carry out one or more of the methods set forth above.

DETAILED DESCRIPTION

Figure 1:
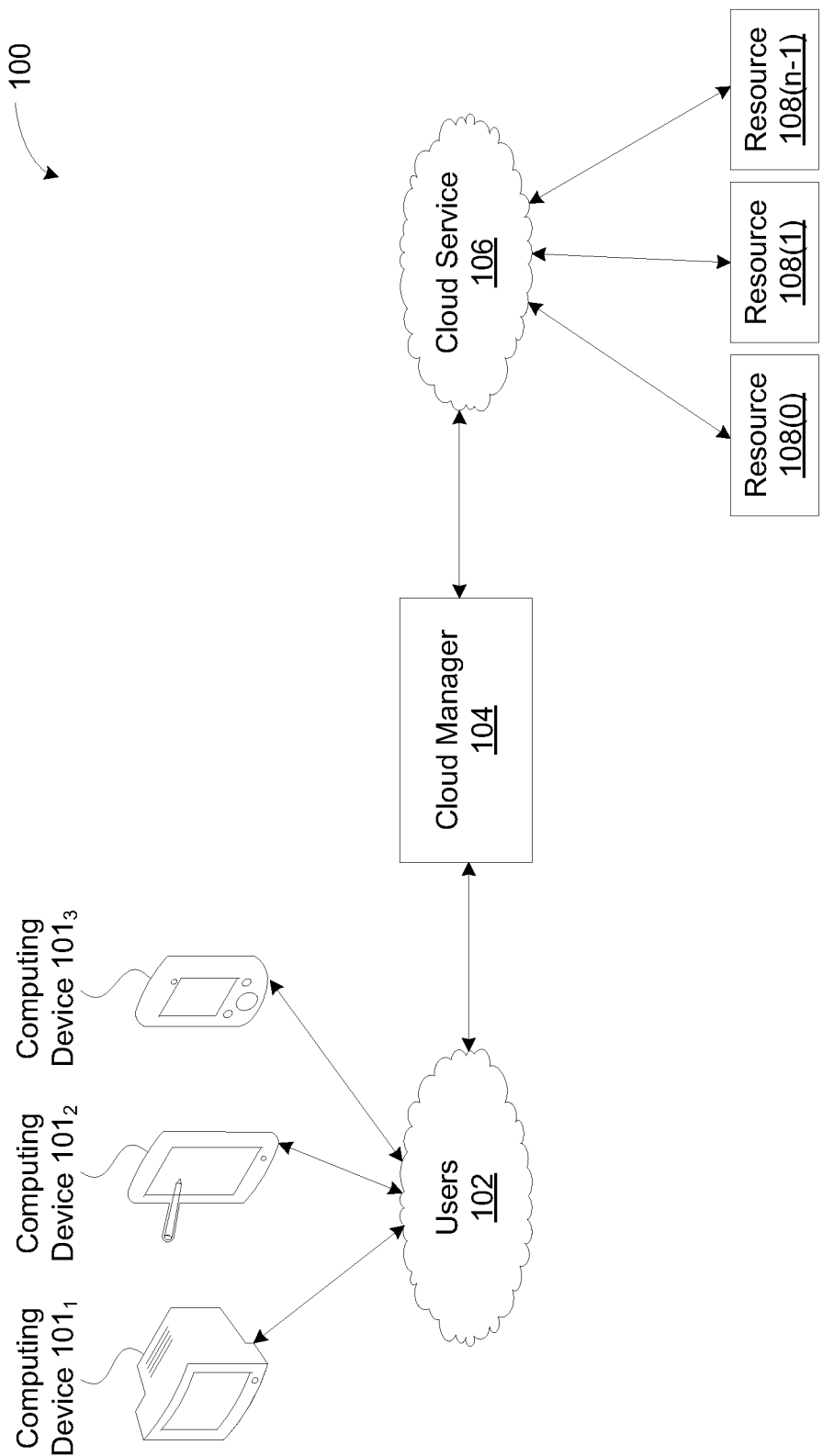
FIG. 1 illustrates a configuration of a cloud computing system in which one or more embodiments of the present invention may be implemented.
Figure 2:
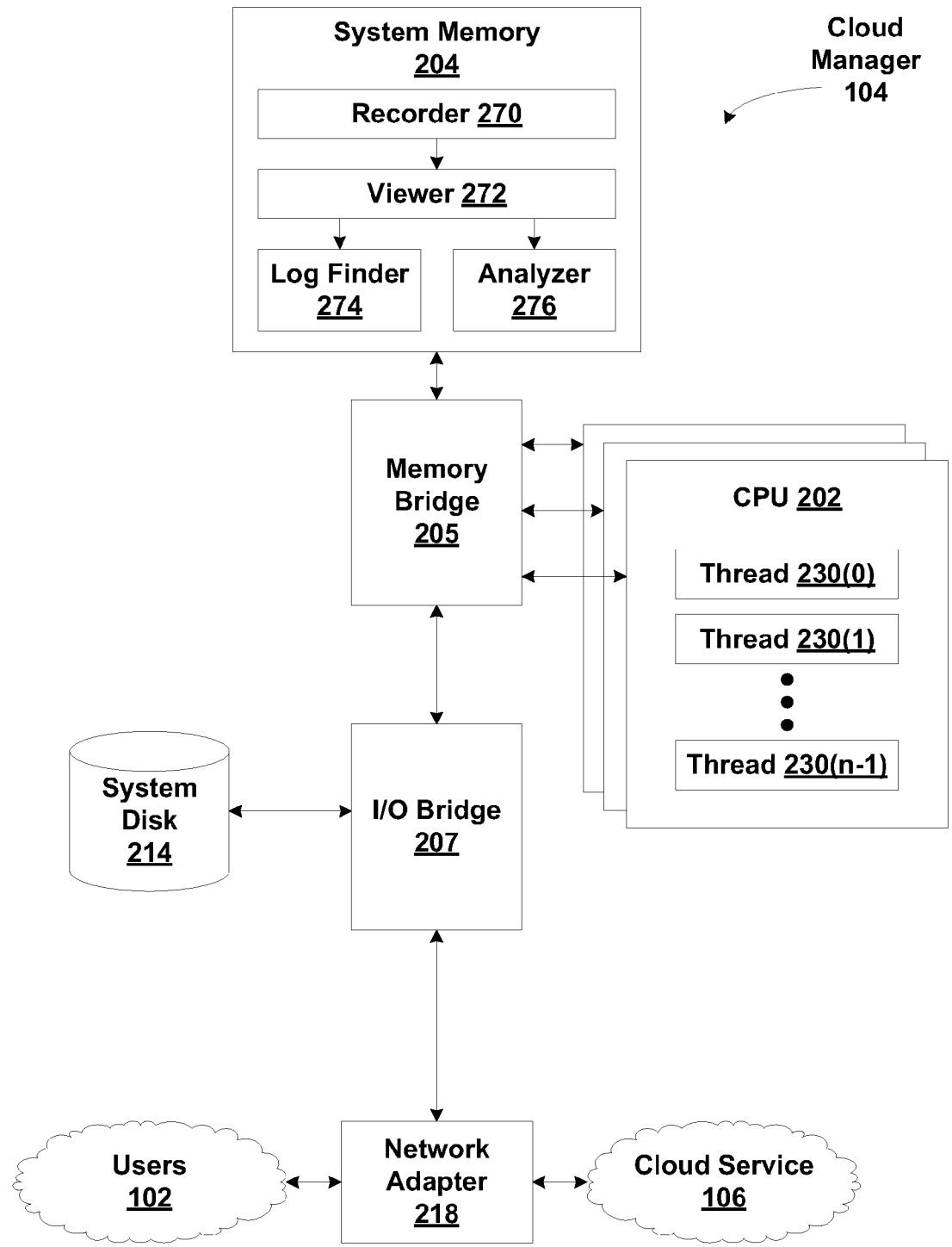
FIG. 2 illustrates a detailed view of a cloud manager configured according to one or more embodiments of the present invention.

FIG. 1 illustrates a configuration of a cloud computing system 100 in which one or more embodiments of the present invention may be implemented. Cloud computing is internet-based computing, whereby shared resources, software, and information are provided, on demand, to computers and other devices. Cloud computing system configuration 100 includes computing devices 101 which comprise users 102. As shown, computing devices 101 represent any computing device capable of communicating with cloud manager 104 through a network connection. Cloud manager 104 may be any computing entity that is configured to manage cloud service 106. Cloud manager 104 manages resources 108 to dynamically serve the requests generated by computing devices 101, where each resource 108 is an entity that is configured to interact with cloud manager 104 (e.g., a hard drive disk array or an array of processors). For example, a resource entity 108 may be a server machine executing one or more virtual machines (VMs) using VMWare® products. As known to those having ordinary skill in the art, cloud manager 104 is able to scale resources 108 based on a number of conditions, such as current processing and memory requirements that are necessary to properly serve the aforementioned requests of computing devices 101. However, this invention is not limited to cloud-based servers and may be implemented using any computing entity FIG. 2 illustrates cloud manager 104 configured according to one or more embodiments of the present invention. Cloud manager 104 includes one or more central processing units (CPUs) 202 and system memory 204 communicating via an interconnection path that may include memory bridge 205. As shown, CPUs 202 are configured to execute threads 230, either concurrently or serially depending on the configuration of the number of CPUs, whether the CPU is multi-core, the configuration of threads 230, and/or the configuration of cloud manager 104. Memory bridge 205 is connected to an I/O (input/output) bridge 207. A system disk 214 is connected to I/O bridge 207. I/O bridge 207 is also connected to other components such as network adapter 218, where network adapter 218 is configured to interact with users 102 and cloud service 106, described above in FIG. 1. It will be appreciated that the system shown herein is illustrative and that variations and modifications are possible.

As shown, system memory 204 includes components of a cloud monitoring application being executing by cloud manager 104. The cloud monitoring application includes recorder 270, which is configured to query, e.g. at a predetermined time interval, CPU 202 to receive a resource consumption value (RCV) associated with each of threads 230 being executed by CPU 202. Upon receipt, recorder 270 stores the RCV (along with previously-gathered RCVs) into system memory 204 or system disk 214 for subsequent analysis. Such analysis may be performed by viewer 272, log finder 274, and analyzer 276. Viewer 272 is configured to parse the RCVs and display a visual representation (e.g., using a line graph) of the RCVs, for example, to an administrator of cloud manager 104. Viewer 272 interacts with log finder 274 and retrieves log file information associated with threads 230 that CPU 202 executed during the aforementioned time intervals. Analyzer 276 is configured to, using the stored RCVs and the visual representation associated therewith, identify processing bottlenecks that occur when CPU 202 executes threads 230. Each of recorder 270, viewer 272, log finder 274 and analyzer 276 are described in further detail throughout FIGS. 3A-7, described below. Note that the cloud manager can be implemented using a standalone server or a VM.

Figure 3:
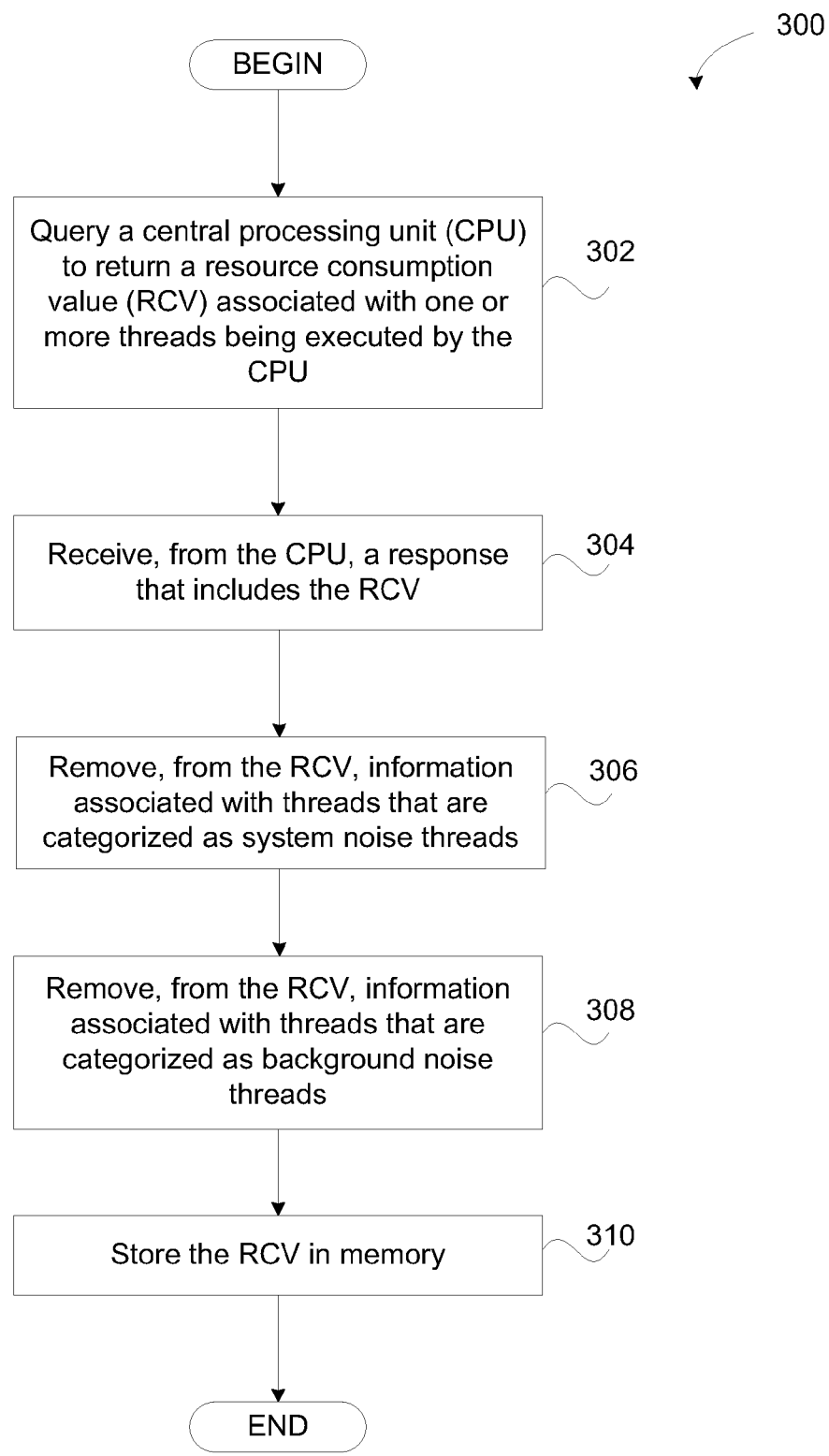
FIG. 3 is a flow diagram of method steps for querying a central processing unit (CPU) to return a resource consumption value associated with one or more threads being executed by the CPU, according to one or more embodiments of the present invention.

FIG. 3 is a flow diagram of method steps 300 for querying a CPU to return a RCV associated with one or more threads being executed by the CPU, according to one or more embodiments of the present invention. Although the method steps are described in conjunction with the cloud manager 104, persons skilled in the art will understand that any system configured to perform the method steps is within the scope of the invention.

Method 300 begins at step 302, where recorder 270 queries CPU 202 to return an RCV associated with each of the threads 230. In one embodiment, recorder 270 is configured to run in real time (i.e., while CPU 202 executes threads not associated with recorder 270) to collect a group of RCVs, where each RCV comprises, for each of threads 230: CPU usage/memory allocation, stack trace information, and log file entries.

To obtain an RCV, in an example configuration where cloud manager 104 is executing a Linux Virtual Machine, recorder 270 calls the Linux "top" command to obtain, from CPU 202, information that comprises an RCV. Recorder 270 may be configured to call the "top" command at a predetermined interval, such as a time interval, a CPU cycle interval, or the like. In a particular version of Linux Virtual Machine, the RCV returned by the "top" command includes an identification (ID) of each thread being executed by CPU 202, where each thread ID indicates a percentage of resources (processing and/or memory) that CPU 202 has allocated thereto. Detailed information associated with each of the threads may be retrieved using the stack trace information, which includes attribute information (e.g. name of the thread) associated with each of the thread IDs. In addition, log file entries that are written by CPU 202 between each of the "top" commands (called by recorder 270) are gathered by recorder 270 and stored in system memory 204 and/or system disk 214.

Since recorder 270 obtains the RCV through the Linux "top" command—which is native to Linux and therefore incurs little overhead to CPU 202—the CPU 202 processing overhead required to satisfy the requests of recorder 270 is minimal (i.e. 0.5% of CPU 202 resources). Further, since recorder 270 stores textual information that may be optionally compressed, the required amount of memory to store the RCVs is also minimal. However, embodiments of the invention may be used with any commands that are used to obtain information similar to that included in an RCV.

Turning back now to method 300, at step 304, recorder 270 receives, from CPU 202, a response that includes the RCV. Since, as described above, the "top" command returns an RCV that is associated with all threads being executed by CPU 202, the RCV also includes information associated with irrelevant threads (referred to herein as "noise").

Typically, there are two types of noise present when CPU 202 executes an operating system (e.g., Linux Virtual Machine). The first type of noise is associated with system threads, such as a Java™ Virtual Machine (JVM) system thread. More specifically, the JVM system thread is continually executing a plurality of tasks that are not relevant to a Java™ application executing therein, such as, for example, the JVM garbage collection thread and the JVM compiler thread. The second type of noise is associated with system background threads, which are threads that execute background processing for the Linux Virtual Machine. Such background processing may include, for example, the synchronization of Lightweight Directory Access Protocol (LDAP) entries, and are also not relevant to the Java™ application. Noise threads typically exhibit relatively low CPU and memory usage. Therefore, threads that possess small thread "areas"—as described in detail below in conjunction with FIG. 6—may be automatically categorized as noise threads and removed from the RCV.

Since, as described above, such noise is irrelevant and should not be considered by recorder 270, at step 306, recorder 270 removes, from the RCV, information associated with threads that are categorized as system noise threads. Similarly, at step 308, recorder 270 removes, from the RCV, information associated with threads that are categorized as background noise threads. Thus, subsequent to step 305, a clean, noise-free RCV has been gathered.

At step 310, recorder 270 stores the RCV in memory (e.g. system memory 204 or system disk 214). These results are subsequently analyzed using viewer 272, log finder 274, and/or analyzer 276, described in further detail below.

Figure 4A:
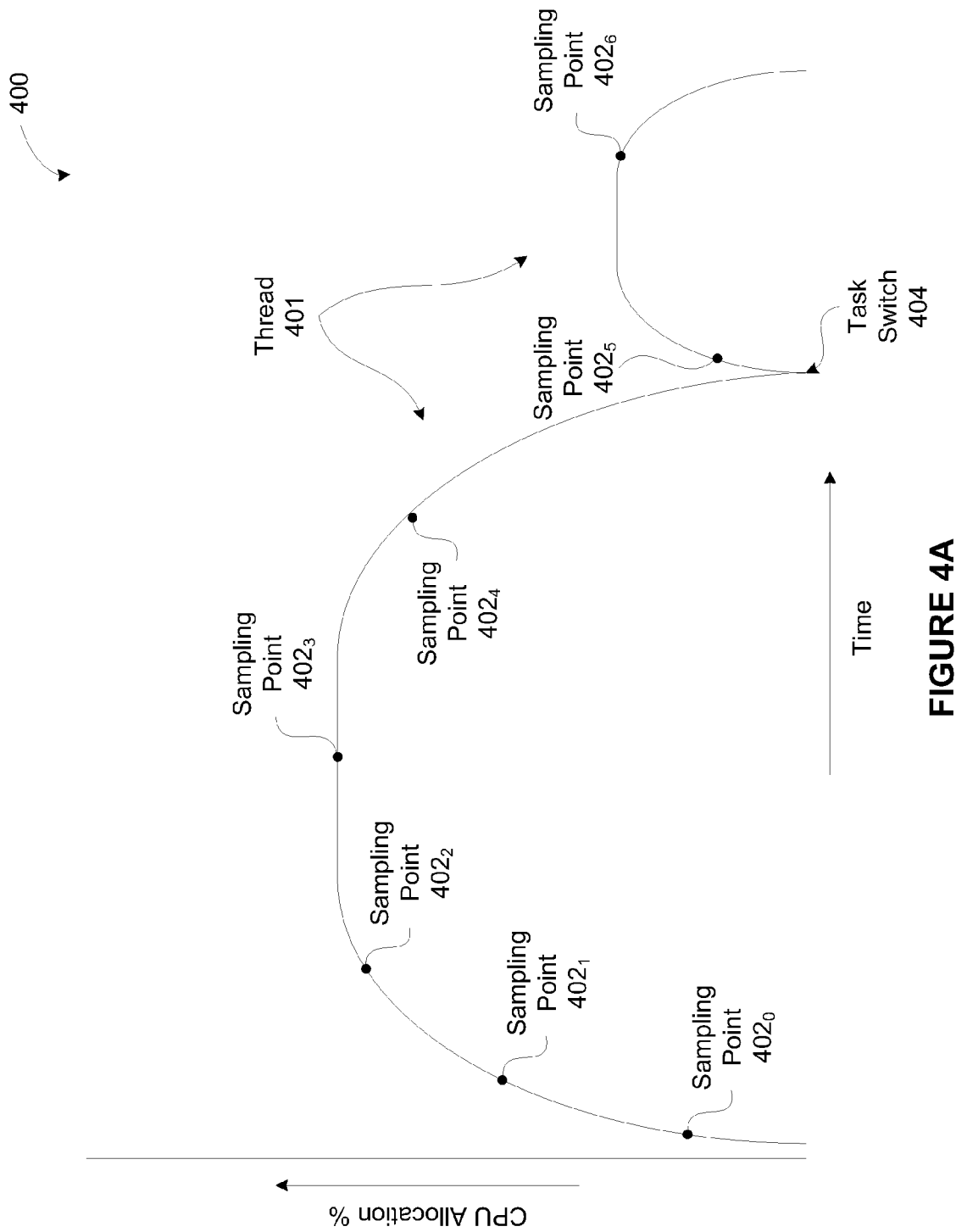
FIG. 4A illustrates a graph that is generated by a viewing application, according to one or more embodiments of the present invention.

FIG. 4A illustrates graph 400 that is generated by viewer 272, according to one or more embodiments of the present invention. As shown, viewer 272 generates graph 400 according to RCVs obtained using method steps 300 of FIG. 3. For the purposes of illustration, information associated with only a single thread 401 is included in graph 400. However, viewer 272 is configurable to generate graphs associated with any number of threads and sampling points associated therewith. Further, the x-axis and y-axis of graph 400 may be associated with alternative information included in the RCVs. For example, the y-axis may instead be associated with an amount of system memory 204 allocated to thread 401, the network traffic incurred by thread 401, or the like. Further, the x-axis may instead be associated with a cycle count of CPU 202 when the corresponding thread resource allocation information was gathered by recorder 270.

As shown, graph 400 includes sampling points $402_0$-$402_6$, where each sampling point 402 is positioned in graph 400 according to a percentage of CPU 202 (represented by the y-axis) allocated to thread 401 at a particular time (represented by the x-axis). Thus, each sampling point 402 represents an RCV returned by a "top" call previously made by recorder 270. Analyzer 276 parses the curve generated by sampling points 403 to determine where task switching occurs within thread 401 and, from such a determination, may potentially identify processing bottlenecks that occur within the cloud manager 104. In most cases, a falling curve that meets a rising curve represents a task switch, as indicated by the task switch 404.

Figure 4B:
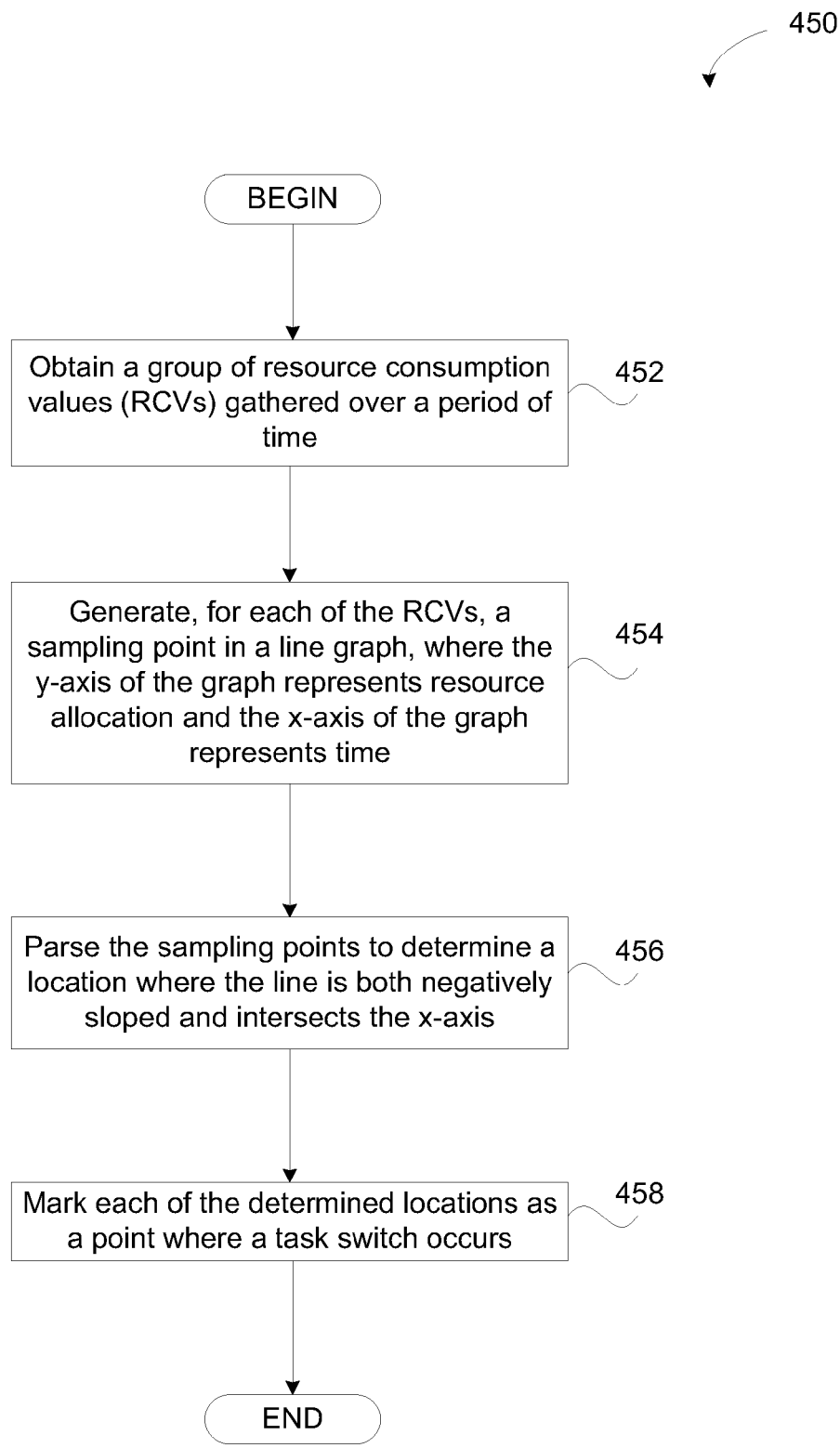
FIG. 4B is a flow diagram of method steps for identifying tasks that execute within a thread, according to one or more embodiments of the present invention.

FIG. 4B is a flow diagram of method steps 450 for identifying tasks that execute within a thread, according to one or more embodiments of the present invention. Method 450 begins at step 452, where analyzer 276 obtains a group of RCVs gathered over a period of time.

At step 454, analyzer 276 generates, for each of the RCVs, a sampling point in a line graph, where the y-axis of the graph represents resource allocation and the x-axis of the graph represents time. At step 456, analyzer 276 parses the sampling points to determine a location where the line both is negatively sloped and intersects the x-axis. Such a location, for example, includes task switch 404 in FIG. 4A. At step 458, analyzer 276 marks each of the determined locations as a point where a task switch occurs.

Upon completion of method steps 450, analyzer 276 is prepared to identify performance bottlenecks through further analysis of RCVs gathered according to method 300 and method 450. More specifically, analyzer 276 is configured to perform two pattern matching techniques that identify common performance bottlenecks. The first pattern matching technique comprises identifying areas of inactivity that occur between processing two or more tasks associated with a thread. The second pattern matching technique comprises identifying duplicate sequential tasks—that is, tasks that are similar in behavior but are nonetheless processed serially when they could otherwise be more efficiently processed in parallel.

Figure 5:
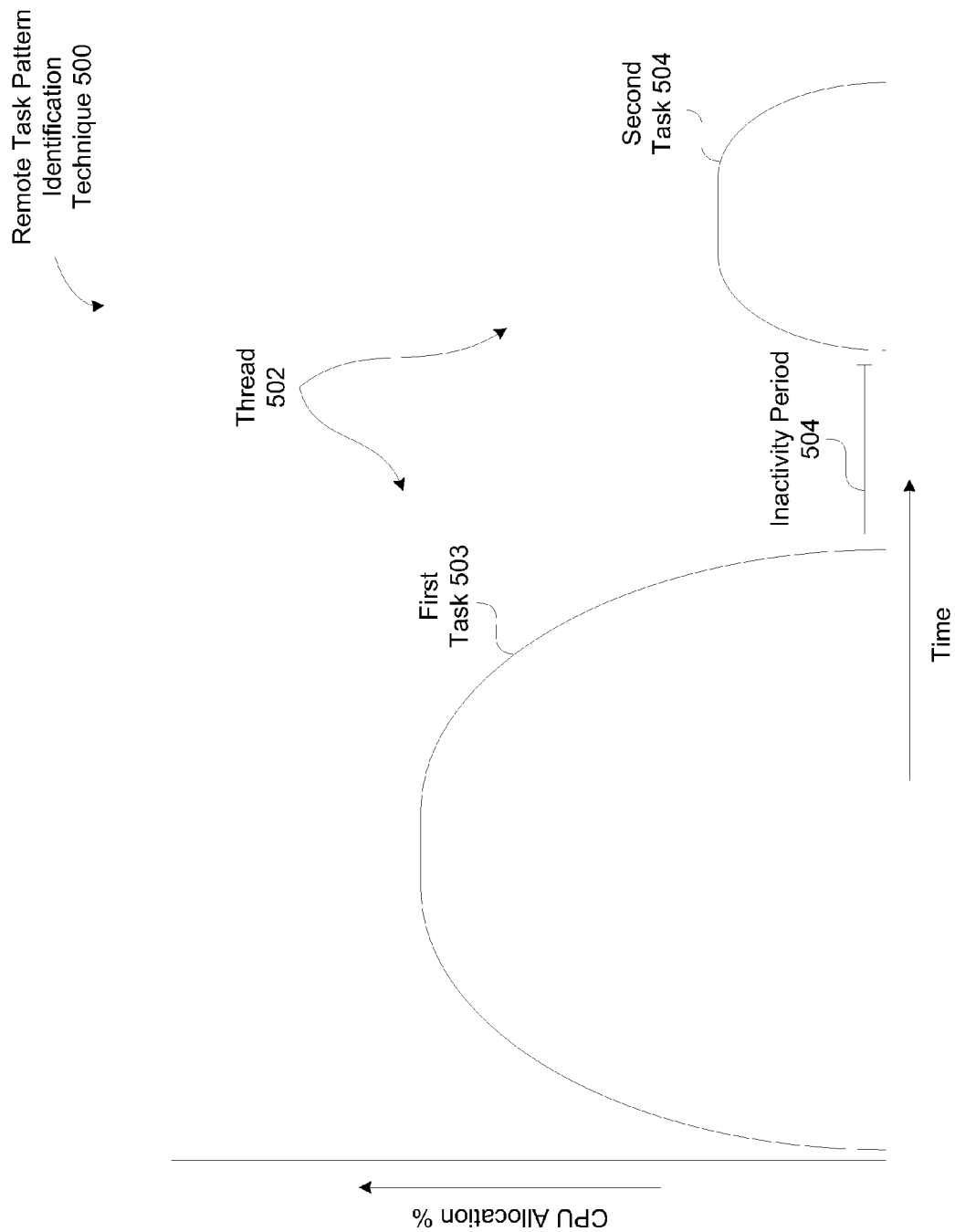
FIG. 5 illustrates a remote task pattern identification technique, according to one or more embodiments of the present invention.

FIG. 5 illustrates remote task pattern identification technique 500, according to one or more embodiments of the present invention. As shown, remote task pattern identification technique 500 is applied to RCVs that include information associated with thread 502. Here, analyzer 276 identifies inactivity period 504 which occurs when thread 502 switches from first task 503 to second task 504, as indicated by the two separate and distinct task curves illustrated in FIG. 5. In one example, inactivity period 504 may occur as a result of second task 504 being dependent on an operation that is not associated with thread 502—such as waiting for an external database included in cloud service 106 to return data requested by first task 503. Upon identification by analyzer 276, viewer 272 activates log finder 274 to retrieve all log file entries associated with the time span in which the inactivity period 504 occurred. Viewer 272 may also pad the time span to retrieve additional log file entries associated with thread 502 activity both before and after inactivity period 504 occurs. This information is presented to the administrator who, upon receipt, could effectively pinpoint the cause of inactivity period 504. Considering the example described above, to eliminate the bottleneck, the administrator would look to enhance the speed of the external database by, for example, increasing processing power or networking bandwidth allocated thereto.

Figure 6:
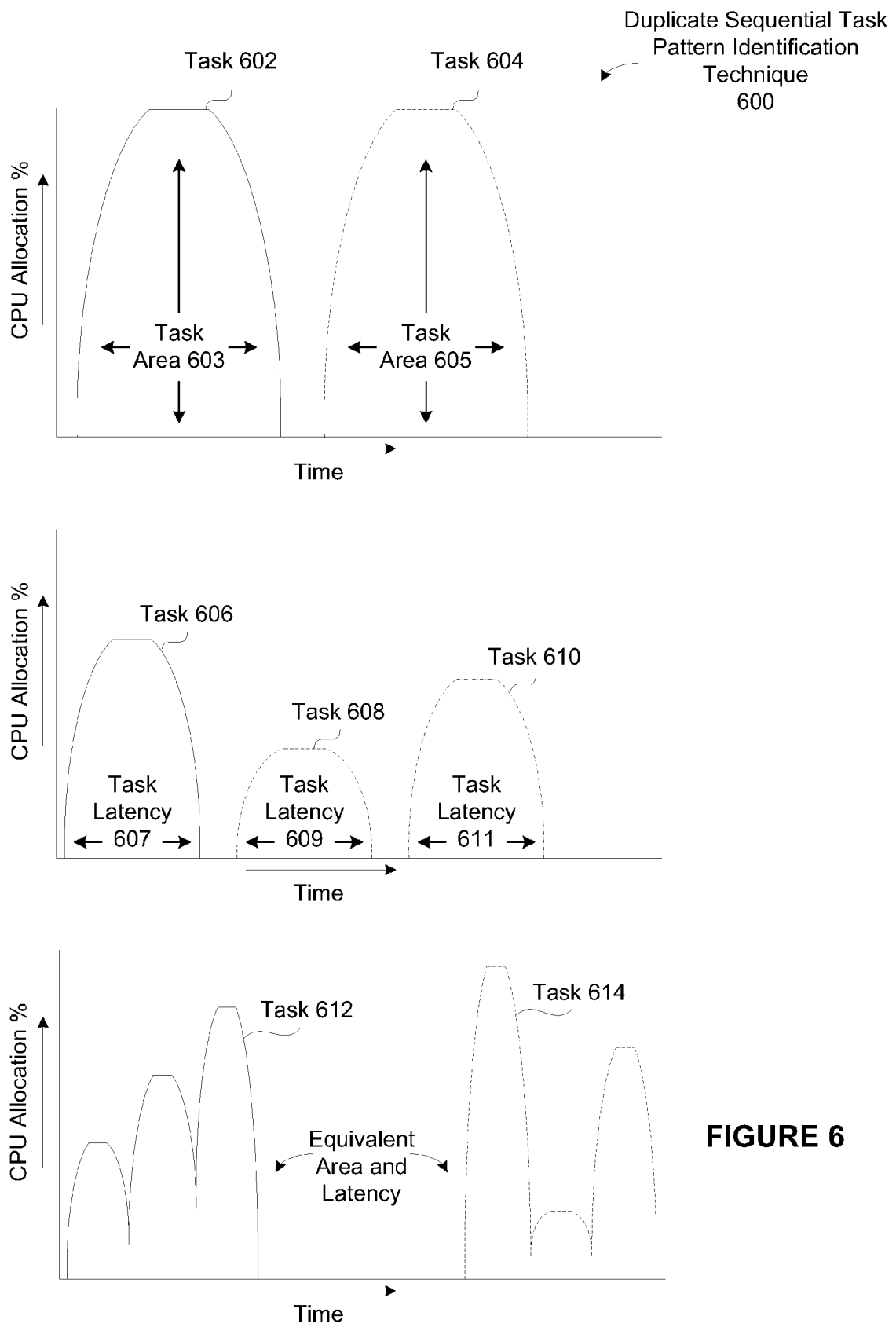
FIG. 6 illustrates a duplicate sequential task pattern identification technique, according to one or more embodiments of the present invention.

FIG. 6 illustrates duplicate sequential task pattern identification technique 600, according to one or more embodiments of the present invention. As shown, the duplicate sequential task pattern identification technique 600 is also, like remote task pattern identification technique 500, executed by analyzer 276 and applied to RCVs gathered by recorder 270. In one embodiment, duplicate sequential task pattern identification technique 600 comprises three separate and distinct analyses that appropriately identify duplicate sequential tasks. The first analysis includes calculating a "task area" of each of the tasks represented in the graph since, in most cases, duplicate tasks consume a similar amount of resources.

The second analysis includes calculating the latencies of each of the tasks represented in the graph since, in most cases, duplicate tasks complete in execution in a similar amount of time. Analyzer 276 performs this analysis by, for each task represented in the graph, subtracting a task-end time stamp from a task-start time stamp.

The third analysis includes calculating the standard deviation of each of the tasks represented in the graph. This third analysis is performed because, though any two tasks might have similar task area and similar latency, their CPU 202 usage variability with respect to time may be significantly distinct.

Each of the analyses, upon calculation, is applied with a weight according to Table 2 illustrated below. Since, under most circumstances, task area and task latency calculations are the salient "features" which indicate a duplicate sequential task, higher weights are assigned to each. Standard deviation calculations are less important and therefore a lower weight is assigned thereto.

TABLE 2

Feature descriptions and their associated weights

| Feature ID | Feature Description | Weight |
| --- | --- | --- |
| $F_1$ | Task Area | $W_1 = 0.4$ |
| $F_2$ | Task Latency | $W_2 = 0.4$ |
| $F_3$ | Standard Deviation | $W_3 = 0.2$ |

The feature $F_1$—that is, the task area feature—may be calculated according to the following equation:

$$f_1 = \frac{(\text{Min}(TA_i, TA_j) \times 100)}{\text{Max}(TA_i, TA_j)}$$

In this equation, $TA_i$ represents a task area for a task $T_i$ and $TA_j$ represents a task area for a task $T_j$. The task areas $TA_i$ and $TA_j$ are calculated according to the sum of the CPU 202 usage (represented by sampling points that comprise, for example, the curves associated with task 602 and task 604) multiplied by the predetermined sampling rate of recorder 270. Examples of tasks that share an identical area are illustrated as task 602 and task 604 and may be calculated according to the following equation:

$$\text{Task Area} = TA = \int_0^t C_T(t)dt$$

$$\int_0^t C_T(t)dt \approx T_0 \sum_{k=0}^t C_T(k)$$

where $T_0$ is the sampling rate

The feature $F_2$—that is, the task latency feature—may be calculated according to the following equation:

$$f_2 = \frac{(\text{Min}(TS_i, TS_j) \times 100)}{\text{Max}(TS_i, TS_j)}$$

In this equation, $TS_i$ represents the number of sampling points associated with task $T_i$ and $TS_j$ represents the number of sampling points associated with task $T_j$. Examples of tasks that share an identical latency but unequal task area are illustrated as tasks 606, 608, and 610.

The feature $F_3$—that is, the standard deviation feature—may be calculated according to the following equation:

$$f_3 = \frac{(\text{Min}(TStdev_i, TStdev_j) \times 100)}{\text{Max}(TStdev_i, TStdev_j)}$$

In this equation, $TStdev_i$ represents the standard deviation for task $T_i$ and $TStdev_j$ represents the standard deviation for task $T_j$. The standard deviation is calculated according to the standard deviation of all the sampling points associated with the corresponding task. This is represented in the following equation.

$$TStdev = \sqrt{\frac{\sum_{k=1}^t (C_k - \overline{C_T})^2}{t-1}}$$

where $$\overline{C_T} = \frac{\sum_{k=1}^t C_k}{t}$$

Further, t represents a number of sampling points associated with the corresponding task. Examples of tasks that share an equivalent area and latency, but unequal standard deviations, are illustrated as tasks 612 and 614.

Upon completion of calculating features $F_1$, $F_2$, and $F_3$, a final value $D(T_i,T_j)$—which indicates a duplicate sequential task pattern value between tasks $T_i$ and $T_j$—is calculated as follows: $(F_1*W_1)+(F_2*W_2)+(F_3*W_3)$. The analyzer 270 may then, according to the preferences of the administrator, identify tasks that share similarities according to duplicate sequential task pattern values and present the results to the administrator.

Figure 7:
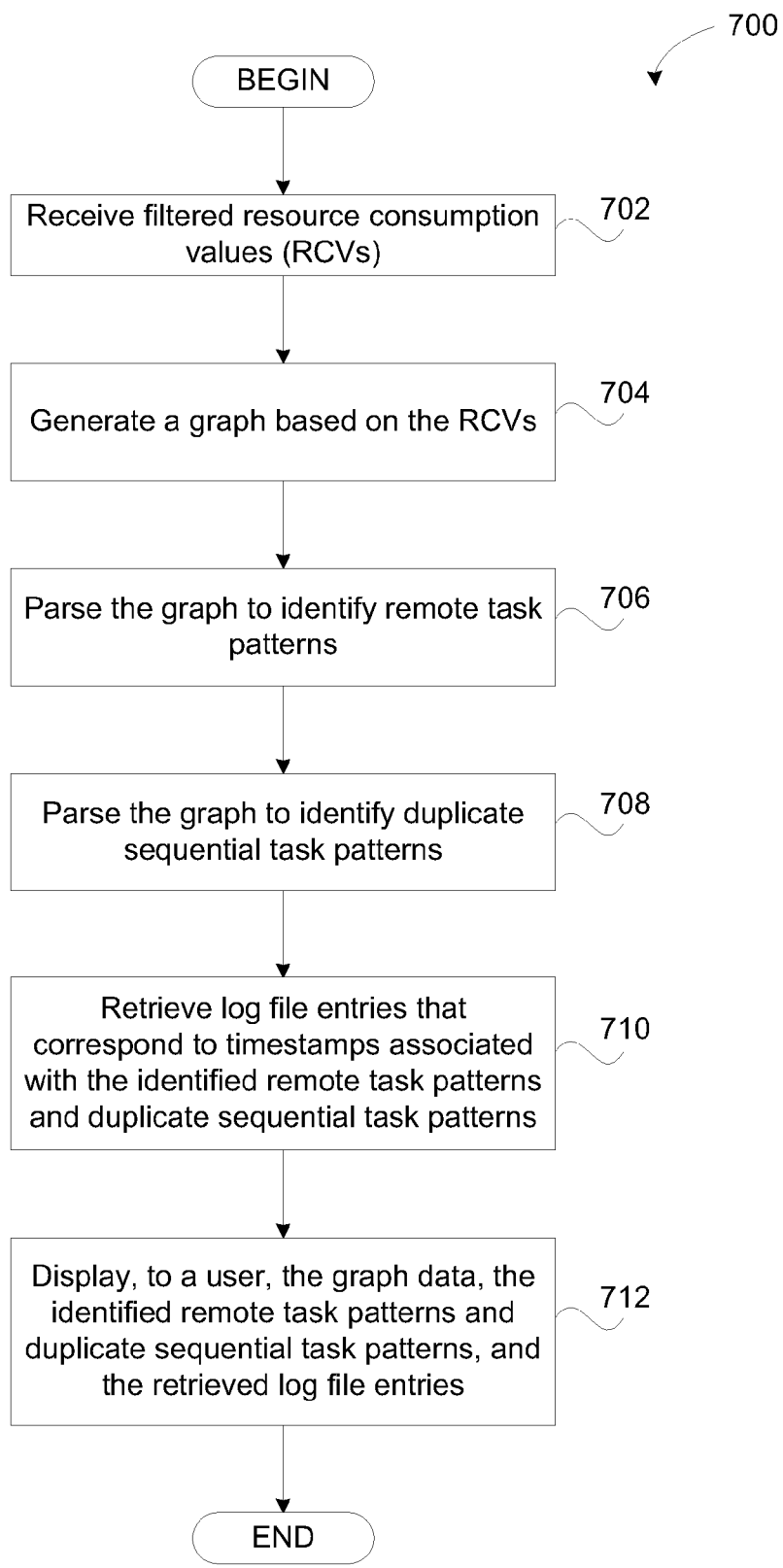
FIG. 7 is a flow diagram of method steps for identifying performance bottlenecks when executing two or more tasks, according to one or more embodiments of the present invention.

FIG. 7 is a flow diagram of method steps 700 for identifying performance bottlenecks when executing two or more tasks, according to one or more embodiments of the present invention. The method 700 begins at step 702, where viewer 272 receives RCVs, such as the RCVs stored, by recorder 270, in memory at step 310 of method 300. At step 704, viewer 272 generates a graph based on the RCVs. Generation of the graph is performed according to the technique described above in FIG. 4A-4B.

At step 706, viewer 272 requests analyzer 270 to parse the graph to identify remote task patterns, according to the technique described above in FIG. 5. Similarly, at step 708, viewer 272 requests analyzer 270 to parse the graph to identify duplicate sequential task patterns, according to the technique described above in FIG. 6. At step 710, viewer 272 requests log finder 274 to retrieve log file entries that correspond to timestamps associated with the identified remote task patterns and duplicate sequential task patterns. At step 712, viewer 272 displays, to the administrator, the graph data, the identified remote task patterns and duplicate sequential task patterns, and the retrieved log file entries.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of monitoring performance of an application server for a group of servers in which one or more threads associated with multiple tasks that manage the group of servers are executed, said method comprising:
    issuing a command to an operating system of the application server to return a resource consumption value representative of the amount of computing resource consumed by one or more threads, the resource consumption value including at least an identification of one of the threads and a corresponding amount of computing resource consumed by the one of the threads;
    storing the resource consumption value;
    repeating said issuing and said storing multiple times over a time period;
    generating a graph of the amount of computing resources consumed by the one of the threads over the time period based on the stored resource consumption values;
    identifying tasks in the one of the threads in the graph, including determining at least one task switch location on the graph based on a rate of change in resource consumption;
    comparing the graph with predetermined patterns, wherein the predetermined patterns include a duplicate task pattern that indicates duplicate tasks defined by active periods of resource consumption separated by at least one inactive period of resource consumption; and
    identifying potential performance improvement areas in the application server based on said comparing, including determining that the graph indicates at least two duplicate tasks based on whether the graph includes the duplicate task pattern; and
    determining that the graph has the duplicate task pattern if two consecutive tasks represented in the graph as active periods of resource consumption separated by at least one inactive period of resource consumption have similar thread areas and similar latencies during their active periods of resource consumption, wherein the predetermined patterns include at least one of an inactive period pattern that includes an inactive period of an undesirable duration between two consecutive tasks represented in the pattern.

2. The method of claim 1, wherein the one of the threads includes multiple tasks and each task is associated with a distinct rising edge and a falling edge represented on the graph.

3. The method of claim 1, wherein said repeating is carried out at a predetermined rate that is user-configurable.

4. The method of claim 1, wherein the computing resource is one of CPU, system memory, and disk IO.

5. The method of claim 1, further comprising:
    filtering threads so that they are not represented in the graph.

6. The method of claim 5, wherein the threads are filtered based on their thread area.

7. The method of claim 5, wherein the threads are filtered if they are background threads or system threads.

8. A method of identifying potential performance improvement areas in an application server for a group of servers in which one or more threads associated with multiple tasks that manage the group of servers are executed, said method comprising:
    issuing a command to an operating system of the application server to return a resource consumption value representative of the amount of computing resource consumed by one or more threads, the resource consumption value including at least an identification of one of the threads and a corresponding amount of computing resource consumed by the one of the threads;
    storing the resource consumption value;
    repeating said issuing and said storing multiple times over a time period;
generating a graph of changes in the resource consumption value for the one of the threads over the time period based on the stored resource consumption values;
identifying tasks in the one of the threads in the graph, including determining at least one task switch location on the graph based on a rate of change in resource consumption;
    comparing changes in the resource consumption value for the one of the threads over the time period with predetermined patterns, wherein the predetermined patterns include a duplicate task pattern that indicates duplicate tasks defined by active periods of resource consumption separated by at least one inactive period of resource consumption; and
    identifying potential performance improvement areas in the application server based on said comparing, including determining that the graph indicates at least two duplicate tasks based on whether the graph includes the duplicate task pattern; and
determining that the graph has the duplicate task pattern if two consecutive tasks represented in the graph as active periods of resource consumption separated by at least one inactive period of resource consumption have similar thread areas and similar latencies during their active periods of resource consumption, wherein the predetermined patterns include at least one of an inactive period pattern that includes an inactive period of an undesirable duration between two consecutive tasks represented in the pattern.

9. A non-transitory computer readable storage medium comprising instructions to be executed by a processing unit of an application server for a group of servers in which one or more threads associated with multiple tasks that manage the group of servers are executed, wherein the instructions, when executed by the processing unit, cause the application server to carry out the steps of:

issuing a command to an operating system of the application server to return a resource consumption value representative of the amount of computing resource consumed by one or more threads, the resource consumption value including at least an identification of one of the threads and a corresponding amount of computing resource consumed by the one of the treads;

storing the resource consumption value;

repeating said issuing and said storing multiple times over a time period;

generating data points for a graph showing the amount of computing resource consumed by the one of the threads over the time period using the stored resource consumption values;

identifying tasks in the one of the threads in the graph, including determining at least one task switch location on the graph based on a rate of change in resource consumption;

comparing the graph with predetermined patterns, wherein the predetermined patterns include a duplicate task pattern that indicates duplicate tasks defined by active periods of resource consumption separated by at least one inactive period of resource consumption; and identifying potential performance improvement areas in the application server based on said comparing, including determining that the graph indicates at least two duplicate tasks based on whether the graph includes the duplicate task pattern; and determining that the graph has the duplicate task pattern if two consecutive tasks represented in the graph as active periods of resource consumption separated by at least one inactive period of resource consumption have similar thread areas and similar latencies during their active periods of resource consumption, wherein the predetermined patterns include at least one of an inactive period pattern that includes an inactive period of an undesirable duration between two consecutive tasks represented in the pattern.

10. The non-transitory computer readable storage medium of claim 9, wherein said repeating is carried out at a predetermined rate that is user-configurable.

11. The non-transitory computer readable storage medium of claim 9, wherein the computing resource is one of CPU, system memory, and disk IO.

* * * * *